US006269630B1

United States Patent
Kreiner et al.

(10) Patent No.: US 6,269,630 B1
(45) Date of Patent: Aug. 7, 2001

(54) ROCKET ENGINE WITH INTERNAL CHAMBER STEP STRUCTURE

(75) Inventors: Kurt B. Kreiner, Hawthorne; David Bronson, Manhattan Beach; Carl R. Stechman, Northridge; Peter E. Woll, Santa Clarita; Joel M. Neiderman, Agoura Hills, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/144,376

(22) Filed: Aug. 31, 1998

Related U.S. Application Data
(60) Provisional application No. 60/057,593, filed on Aug. 29, 1997.

(51) Int. Cl.⁷ .................................................. F02K 9/42
(52) U.S. Cl. ................................. 60/258; 60/39; 60/32
(58) Field of Search ............................ 60/257, 258, 39.32

(56) References Cited

U.S. PATENT DOCUMENTS

| | | |
|---|---|---|
| 4,785,748 | 11/1988 | Sujata et al. . |
| 4,882,904 | 11/1989 | Schoenman . |
| 4,915,938 | 4/1990 | Sujata et al. . |
| 4,936,091 | 6/1990 | Schoenman . |
| 6,138,450 * | 10/2000 | Kreiner et al. ........................ 60/257 |
| 6,138,451 * | 10/2000 | Kreiner et al. ........................ 60/258 |

OTHER PUBLICATIONS

Jassowski, Donald M. et al., "Advanced Samll Rocket Chambers Option 1–14 Lbf Ir–Re Rocket", NASA Contract 191014, Aug. 1992.

* cited by examiner

*Primary Examiner*—Charles G. Freay
(74) *Attorney, Agent, or Firm*—T. Gudmestad

(57) ABSTRACT

A rocket engine includes a generally cylindrical annular combustion chamber, an injector attached to an injector end of the combustion chamber, a generally cylindrical annular step collar fitting within the combustion chamber at the injector end thereof, and an attachment of the combustion chamber, the injector, and the step collar. The maximum outer diameter of the step collar is from about 0.020 inches to about 0.024 inches smaller than the inner diameter of the combustion chamber, and has a length of from about 21 to about 31 percent of the length of the combustion chamber. The step collar is made of a material having a melting point greater than that of the combustion chamber. The attachment preferably includes a clip structure joining the combustion chamber and the step collar. The clip structure includes a C-shaped annular clip having a first leg extending parallel to the chamber length and with an inner diameter of about that of the outer diameter of the combustion chamber and affixed thereto, a second leg extending parallel to the chamber length and with an outer diameter of no greater than that of the outer diameter of the step collar and affixed thereto, and a web extending between the first leg and the second leg.

20 Claims, 2 Drawing Sheets

ROCKET ENGINE WITH INTERNAL CHAMBER STEP STRUCTURE

This application claims the benefit of U.S. Provisional Application No. 60/057,593, filed Aug. 29, 1997, the disclosure of which is hereby incorporated herein by reference.

BACKGROUND OF THE INVENTION

This invention relates to the structure of a liquid-fueled rocket engine, and, more particularly, to the structure at the injector end of the combustion chamber.

A typical liquid-fueled rocket engine includes a generally cylindrical combustion chamber, with an injector attached to its injector end and a flared nozzle attached to its nozzle end. A liquid propellant including fuel and an oxidizer flows through injector ports in the injector and into the combustion chamber. The propellant mixes and ignites in the combustion chamber. The hot gas resulting from the combustion expands through the nozzle and drives the rocket engine and the attached rocket structure in the direction opposite to that in which the nozzle is pointed.

In order to achieve maximum efficiency of the rocket engine in terms of thrust per weight of propellant and maximum specific impulse, the mixing of the propellant components must be complete to encourage complete combustion. An internal step structure at the injector end of the combustion chamber had been previously developed to promote the complete mixing and combustion. However, early versions of the rocket engine having the internal step structure within the combustion chamber suffered from two problems. First, their efficiency, while better than that of a rocket engine of comparable weight but having no internal step structure, was not as good as desired. Second, in some cases there was premature failure of the wall of the combustion chamber during fabrication or during test firings.

The second problem is of particular concern, because a preferred embodiment of the rocket engine is to be used in commercial communications satellites. The rocket engine boosts the satellite from low-earth orbit to geosynchronous orbit or initiates interplanetary missions. If the rocket engine combustion chamber fails prior to completion of its mission, the entire satellite may be lost to service because it does not achieve the required geosynchronous orbit.

Thus, while the rocket engine with internal step structure in the combustion chamber offers important potential benefits in terms of improved efficiency, those benefits have not been fully realized in initial forms of the rocket engine. There is a need for a design which achieves maximum efficiency with high reliability and low likelihood of premature failure. The present invention fulfills, this need, and further provides related advantages.

SUMMARY OF THE INVENTION

The present invention provides a rocket engine having an internal step structure at the injector end. The configuration of the step structure is optimized for high combustion efficiency and high specific impulse while protecting the wall of the combustion chamber and maintaining a relatively cool injector end. The attachment of the step structure to the injector and to the wall of the combustion chamber is selected to achieve sufficient structural strength and seating against leakage of hot gas, and also to prevent damage to the combustion chamber wall. The resulting rocket engine has high efficiency and also good reliability.

In accordance with the invention, a rocket engine comprises a generally cylindrical annular combustion chamber having a wall with a chamber outer diameter and a chamber inner diameter. The chamber has an injector end, a throat, and a nozzle end. The injector is attached to the injector end of the combustion chamber. The chamber length is measured from the injector face to the throat. A generally cylindrical annular step collar fits within the combustion chamber adjacent to the injector end thereof. The step collar has a step collar outer diameter, a step collar inner diameter, and a step collar length measured from the injector face to the end of the step. There is an attachment of the combustion chamber, the injector, and the step collar.

In one form of the invention, the step collar outer diameter is less than the chamber inner diameter by a clearance amount or gap. The clearance allows the fabrication of the rocket engine to be performed without damaging the wall of the combustion chamber. The clearance also allows the step collar to expand during the heating experienced when the rocket engine is operated, without cracking the wall of the combustion chamber. That is, the gap should be sufficiently great that it is not closed and a clearance remains when the rocket engine is operated and the step collar expands radially outwardly toward the wall of the combustion chamber. On the other hand, the gap should not be larger than necessary to provide for this clearance during operation, so that hot gas does not flow into the gap by a backdraft effect to damage the inner surface of the wall of the combustion chamber. In a preferred embodiment of the rocket engine wherein the inner diameter of the wall of the combustion chamber is about 1.78 inches, the difference in the step collar outer diameter and the chamber wall inner diameter is from about 0.020 inches to about 0.024 inches, measured at room temperature. That is, the gap between the step collar outer diameter and the chamber wall inner diameter is from about 0.010 inches to about 0.012 inches.

In another embodiment, the step collar length is from about 21 percent to about 31 percent of the chamber length. This step collar length achieves an optimized performance of the engine while avoiding damage to the inner surface of the wall of the combustion chamber by hot combustion gasses.

In yet another embodiment, the combustion chamber is made of a first material, and the step collar is made of a second material different from the first material and having greater corrosion and erosion resistance than that of the first material in the combustion chamber environment, in order to withstand the combustion environment that it experiences from being in direct contact with the combustion gases. Examples of preferred materials of construction of the step collar include an alloy of platinum and rhodium, an alloy of columbium, or a ceramic.

The injector, step collar, and combustion chamber must be joined together at the injector end of the combustion chamber by the attachment which provides sufficient strength, seals against the leakage of hot combustion gas from the interior of the combustion chamber, and prevents damage due to the large dimensional changes experienced during the firing of the rocket engine. In the preferred approach, the attachment includes a step collar/injector joint structure joining the step collar and the injector, and a clip structure joining the combustion chamber and the step collar. The clip structure comprises a C-shaped annular clip having a first leg extending parallel to the chamber length and with an inner diameter of about that of the outer diameter of the combustion chamber and affixed thereto, a second leg extending parallel to the chamber length and with an outer diameter of no greater than that of the outer diameter of the step collar and affixed thereto, and a web extending between the first leg and the second leg. This C-clip provides the necessary strength by acting in the manner of a circumferential rib to withstand hoop stresses produced during the manufacturing and the firing of the rocket engine and also the thermal expansion stresses. It seals the injector end, and also allows the step collar to differentially expand without loading excessive additional stress into the wall of the combustion chamber. The clip is preferably made from a molybdenum alloy, most preferably an alloy of 50 weight percent molybdenum, 50 weight percent rhenium whose surface is gold plated.

The present invention thus provides a rocket engine which has improved efficiency of operation and improved specific impulse due to the presence of the internal step within the combustion chamber. It also has good reliability because its structure withstands the combustion temperatures to which it is exposed, and absorbs the additional stresses caused by the presence of the step collar. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
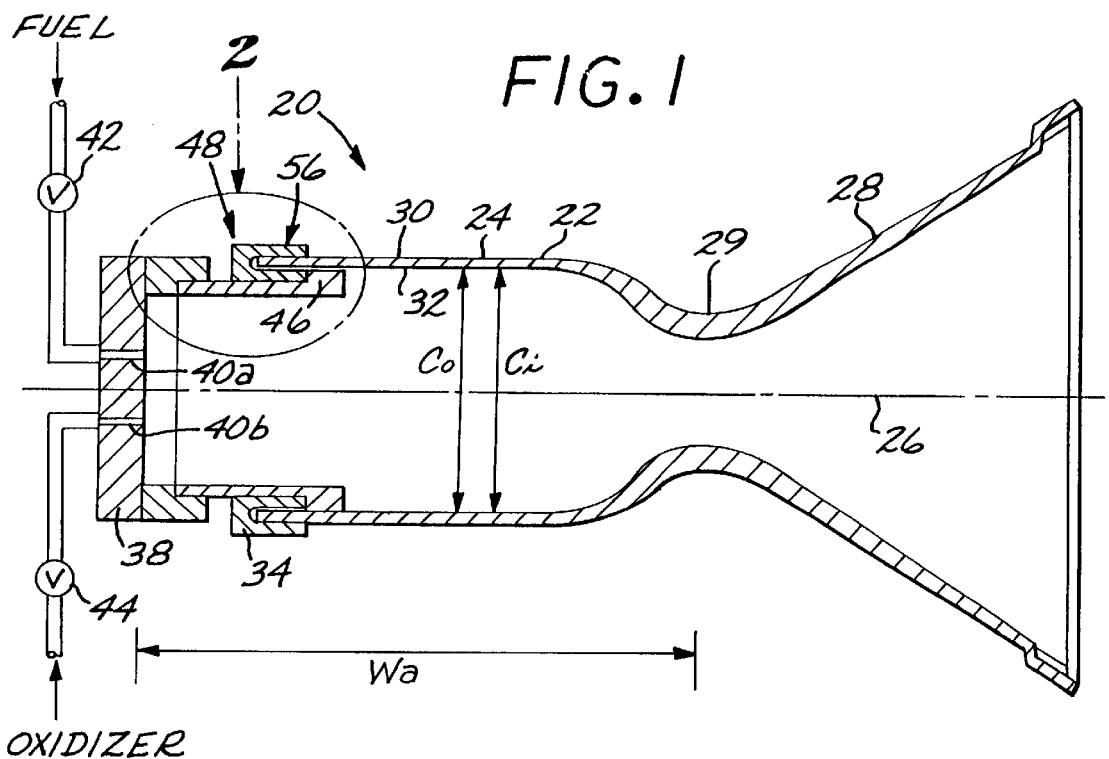
FIG. 1 is a sectional view of a rocket engine.
Figure 2:
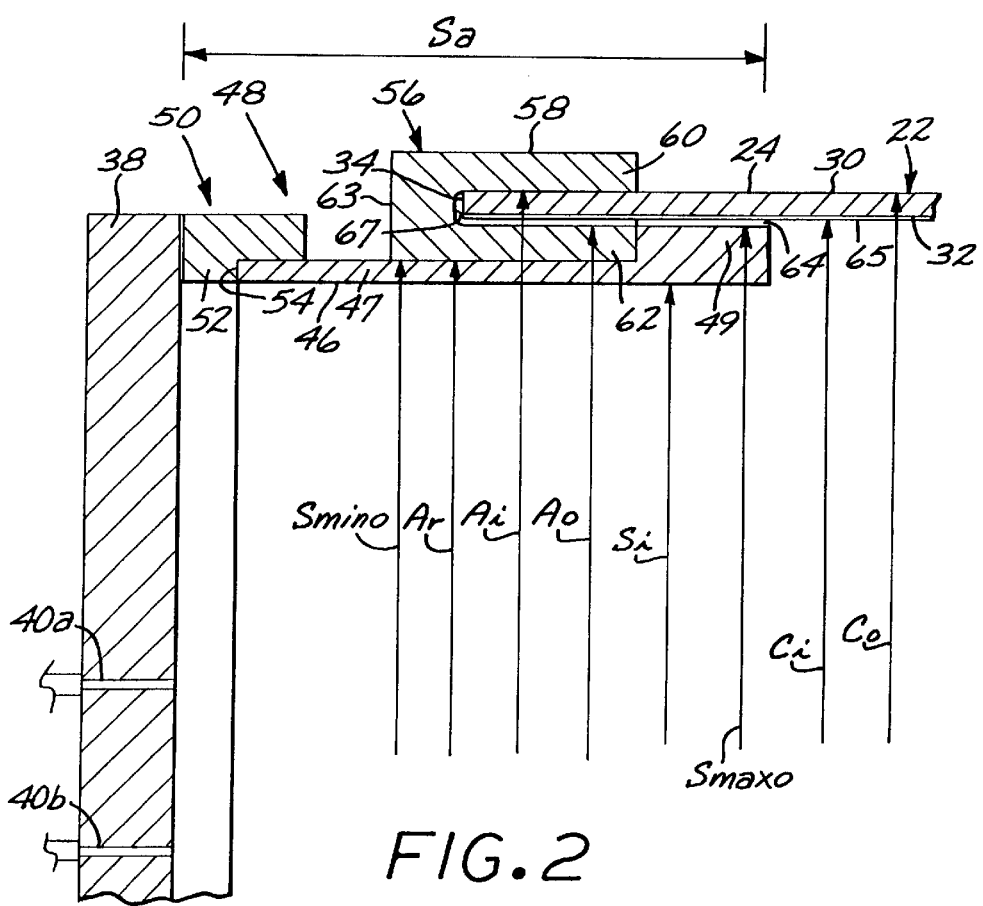
FIG. 2 is an enlarged detail of FIG. 1 in region 2—2, showing the injector and injector end of the combustion chamber.

FIG. 1 depicts a rocket engine 20, and FIG. 2 shows a detail of the rocket engine. The rocket engine 20 includes a combustion chamber 22 having two major parts, a generally cylindrical annular wall 24 having a cylindrical axis 26, and an expansion nozzle 28. A narrowed throat 29 separates the cylindrical wall 24 from the expansion nozzle 28. In the illustrated rocket engine 20, the wall 24, the throat 29, and the nozzle 28 are fabricated separately and joined together, but they may instead be formed integrally. The cylindrical wall 24 has an outer cylindrical surface 30 with a cylindrical outer diameter $C_o$ and an inner cylindrical surface 32 with a cylindrical inner diameter $C_i$. The combustion chamber 22 has an injector end 34 and a nozzle end 36.

An injector 38 is attached to the injector end 34 of the combustion chamber 22. The injector 38 may be of any operable design, but is typically a plate having a plurality of injector ports 40 therein, of which only two are shown in FIG. 1. The propellant is provided to the combustion chamber 22 through the injector ports 40. Some of the injector ports 40a are supplied with a fuel through a fuel valve 42, and others of the injector ports 40b are supplied with an oxidizer through an oxidizer valve 44. The fuel and oxidizer flow through their respective injector ports 40 into the interior of the combustion chamber 22 and mix together. Where the mixture is hypergolic, as in the case of the preferred monomethylhydrazine (fuel) and nitrogen tetroxide/3 percent nitric oxide (oxidizer), the mixture ignites spontaneously. In other cases involving propellants where the mixture does not spontaneously ignite, an ignitor (not shown) is provided. The gaseous combustion products of the combustion expand rearwardly and outwardly through the nozzle 28 and drive the rocket engine 20, and the spacecraft to which it is attached, in the opposite direction.

To aid in the thorough mixing and combustion of the propellant fuel and oxidizer, a generally cylindrical annular step collar 46 is fitted within the combustion chamber 22 at and adjacent to the injector end 34 thereof. When viewed in circumferential section as in FIG. 2, the step collar 46, which is preferably made of a single piece of material, has a generally "L" shape, with a long leg 47 of the "L" lying parallel to the cylindrical axis 26 and a short leg 49 of the "L" lying perpendicular to the cylindrical axis 26. The short leg 49 of the "L" extends further radially outwardly from the location where it meets the long leg 47. The step collar 46 has an inner cylindrical diameter $S_i$, a minimum outer cylindrical diameter $S_{mino}$ defined by the long leg of the "L", and a maximum outer cylindrical diameter $S_{maxo}$ defined by the shorter leg of the "L". The stepped end of the step collar 46 is at a distance $S_a$, from the injector 38, in the direction parallel to the cylindrical axis 26. This distance $S_a$, may be compared with the overall length $W_a$ of the wall 24 from the injector 38 to the throat 29.

An attachment 48 joins the combustion chamber 22, the step collar 46, and the injector 38. The attachment includes several elements and several joints. The attachment must mechanically join the combustion chamber 22, the step collar 46, and the injector 38 to bear the loads imposed during handling and service, even through large temperature changes and gradients are experienced during service, and also provide a seal against the leakage of hot gas at the injector end 34 of the combustion chamber 22. A step collar/injector joint structure 50 joins the injector 38 to the step collar 46. In this preferred form, the step collar/injector joint structure includes a cylindrical annular adaptor 52 joined to the end 54 of the step collar 46 closest to the injector 38. The adaptor 52 is joined to the periphery of the injector 38, so that it does not overlie any of the injector ports 40.

The attachment 48 includes a clip structure 56 having a cylindrical annular clip 58 which joins the wall 24 of the combustion chamber 22 to the step collar 46. The clip 58 includes a first leg 60 lying outwardly from the wall 24 and extending parallel to the axis 26. The first leg 60 has an inner cylindrical diameter $A_i$, which is very slightly larger, typically by about 0.010–0.012 inches, than the outer diameter $C_o$ of the wall 24, so that the first leg 60 may slip over in facing relation to, and be affixed to, the outer cylindrical surface 30. The clip 58 includes a second leg 62 lying inwardly from the wall 24 and extending parallel to the axis 26. The second leg 62 has an outer cylindrical diameter $A_o$, which is smaller, typically by about 0.020–0.024 inches, than the inner diameter $C_i$ of the wall 24. Preferably, $A_o$, is about the same as $S_{maxo}$, so that the surfaces defined by these diameters are flush. The second leg 62 has an inner cylindrical diameter $A_r$, which is very slightly larger, typically by about 0.006–0.010 inches, than the minimum diameter $S_{mino}$ of the step collar 46, and the two facing surfaces are affixed together. A web 63 connects the first leg 60 and the second leg 62.

The step collar 46 is not joined directly to the wall 24 because in such a structure the outward thermal expansion of the step collar 46 during service deforms the wall 24 and can lead to its failure. Instead, the clip 58 serves to bear part of the stress and can also absorb strain in the manner of a spring by the bending of the legs.

The dimensions of the wall 24, the step collar 46, and the clip 58 are selected such that there is a gap 64 between the second leg 62 of the clip 58 and the step collar 46, on the one hand, and the inner cylindrical surface 32 of the wall 24. The size of the gap is selected in conjunction with the configuration of the engine, the heating and cooling service cycle of the engine, and the materials of construction of the engine. In the preferred embodiment discussed herein wherein the nominal diameter $C_i$ of the inner cylindrical surface 32 is about 1.780 inches, the size of the gap 64 may be defined by stating that $S_{maxo}$, and $A_o$ are each less than $C_i$ by from about 0.020 to about 0.024 inches, all measurements being made at room temperature. These are diametric measurements, so that the dimension of the gap 64 is from about 0.010 to about 0.012 inches. If the diametric difference is less than about 0.020 inches, the step collar 46 may expand during service into contact with the inner cylindrical surface 32 of the wall 24 and deform or crack it. If the diametric difference is more than about 0.024 inches, combustion gases may flow into the gap 64 by a backdraft effect, potentially causing damage to the wall of the combustion chamber. Thus, the dimension of the gap 64 is desirably just large enough so that the step collar 46 does not contact and deform the wall 24 during the service cycle of the engine, but no larger so that there is a backdraft effect.

Based upon these guidelines, the selection of the dimension of the gap 64 for other configurations and materials of construction will be apparent to those skilled in the art. The dimensional changes of the step collar 46 and the wall 24 may be modeled and the magnitude of the differential radial thermal expansion between the step collar and the wall calculated using existing analysis techniques such as finite element analysis. The dimension of the gap 64 is selected according to the criteria stated above, specifically that the gap 64 should be sufficiently large that the step collar 46 does not expand and crack the wall 24 but no larger than that (within manufacturing tolerances) to avoid a backdraft effect in the gap. That is, any contact load between the step collar 46 and the wall 24 at the operating temperature must be such that the failure strength of the wall 24 is not exceeded. More preferably, there is no contact between the step collar 46 and the wall 24 at the operating temperature of the engine, and there is a minimal clearance between the step collar 46 and the wall 24 at the operating temperature. The minimal clearance between the step collar 46 and the wall 24 at the operating temperature is dictated by these considerations and by the manufacturing tolerances, and is preferably less than about 0.005 inches, and most preferably less than about 0.002 inches. For example, in some configurations of the engine the diametric difference may range from about 0.020 inches to about 0.048 inches, or a dimension of the gap 64 of from about 0.010 inches to about 0.024 inches, measured at room temperature.

The step collar 46 serves to improve the mixing of the propellants near the point of injection so that the efficiency and the specific impulse of the rocket engine are improved. The performance of the step collar 46 is optimized by providing its length $S_a$ such that the ratio $S_a/W_a$ is from about 0.21 to about 0.31 (i.e., $S_a$ is from about 21 percent to about 31 percent of $W_a$). Several rocket engines were constructed with step collars having a range of $S_a/W_a$ values. These engines were fired to determine their performance. These tests showed that the specific impulse of the engine (ISP) decreases with increasing step length over the range of $S_a/W_a$, from about 0.2 up to about 0.4. Based upon these data it was concluded that, if the ratio $S_a/W_a$ is greater than about 0.31, the ISP becomes unacceptably low for many missions.

The step collar is preferably made of a material that is more corrosion and erosion resistant than the material of the chamber wall, because it is preferred that the hot combustion gases impinge against the step collar 46 rather than against the inner surface of the chamber wall 24. Consequently, if the ratio $S_a/W_a$ is made too small so that the step collar is too short in the axial direction, the outward momentum of the hot combustion gases causes the hot combustion gases to impinge against the inner surface of the chamber wall 24 rather than against the inner surface of the step collar 46, leading to the damage of the chamber wall 24. A rocket engine 20 was constructed with a step collar having an $S_a/W_a$ ratio of 0.21. When fired for a prolonged period, there was observed some damage to the inner surface of the chamber wall 24 downstream of the end of the step collar 46, indicating that the step collar bordered on being too short in the axial direction. Accordingly, it was concluded that $S_a/W_a$ should not be less than about 0.21.

The length of the step collar measured from the injector to the end of the step collar, $S_a$, is therefore from about 21 percent to about 31 percent of the length of the engine measured from the injector to the throat of the engine, $W_a$. More preferably, $S_a$ is from about 26 percent to about 31 percent of $W_a$. Most preferably, $S_a$ is about 28 percent of $W_a$, a value which gives both good ISP performance and good protection of the chamber wall from the hot exhaust gases.

The step collar 46 is directly exposed to some of the most severely corrosive and erosive environments found within the combustion chamber 22. It is therefore made of a material having a greater corrosion and erosion resistance than the wall 24 of the combustion chamber 22. The step collar 46 is preferably made of a material having a high melting point and good corrosion/erosion resistance in the combustion environment of the combustion chamber 22, such as an alloy of platinum and rhodium, an alloy of columbium, or a ceramic. The preferred alloy of platinum and rhodium is 90 percent by weight platinum, balance rhodium. The preferred alloy of columbium is 10 percent by weight hafnium, 1 percent by weight titanium, balance columbium. The preferred ceramic is aluminum oxide, thorium oxide, or yttria-stabilized zirconium oxide.

Figure 3:
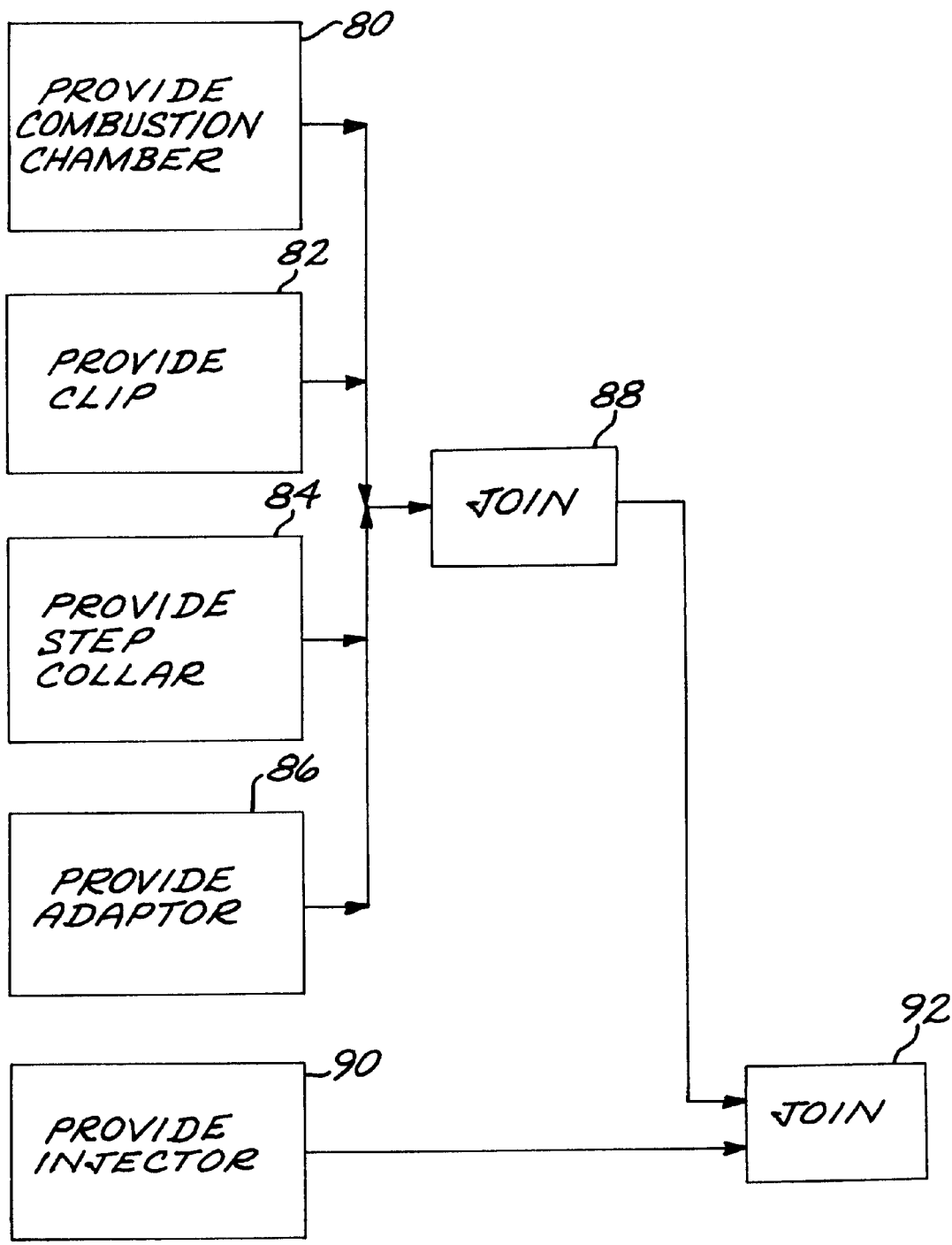
FIG. 3 is a block flow diagram of a method for constructing the rocket engine.

FIG. 3 depicts a preferred approach for fabricating the rocket engine 20. In the following discussion, preferred materials, nominal dimensions, and joining techniques used in the fabrication of the rocket engine of most interest to the inventors are described, but the invention is not limited to these disclosed items unless otherwise noted. The combustion chamber 22 is provided, numeral 80. The combustion chamber may be made of any operable material, but is preferably made of rhenium having a coating 65 of iridium, about 0.003–0.005 inches thick, on the inner cylindrical surface 32 to protect the rhenium from corrosion damage during service. The combustion chamber may be of any operable size and specific configuration. For a preferred application of interest to the inventors, the nominal overall length of the combustion chamber 22 is about 3.7 inches, the nominal diameter $C_i$ of the inner cylindrical surface 32 is about 1.780 inches, and the nominal diameter $C_o$ of the outer cylindrical surface 30 is about 1.910 inches (so that the thickness of the wall 24 is about 0.065 inches.

The clip 58 is provided, numeral 82. The clip 58 may be made of any operable material, but is preferably made of an alloy of molybdenum-50 percent by weight rhenium, which is plated with a thin gold plating. This material has a strength that is several times greater than that of the rhenium material of the combustion chamber 22. With this greater strength, the clip 58 serves in the manner of a circumferential rib to carry the load produced by the differential thermal expansion of the step collar 46 during service, ensuring that minimal load is transferred to the wall 24 of the combustion chamber 22 as the step collar 46 expands upon heating in service. In the preferred embodiment, pertinent nominal dimensions of the clip 58 are $A_i$, of 1.901 inches, $A_o$ of 1.738 inches, and $A_r$ of 1.571 inches. (The inner diameter of the first leg 60 is subsequently match machined to the outer diameter of the combustion chamber, so that there is a spacing of no more than about 0.005–0.006 between them.)

The step collar 46 is provided, numeral 84. The step collar 46 may be made of any operable material having sufficient oxidation and erosion resistance, but is preferably made of a refractory material such as an alloy of platinum and rhodium, or an alloy of columbium. The preferred alloy of platinum and rhodium is 90 percent by weight platinum, balance rhodium. The preferred alloy of columbium is 10 percent by weight hafnium, 1 percent by weight titanium, balance columbium. The preferred ceramic is aluminum oxide, thorium oxide, or yttria-stabilized zirconium oxide. In the preferred embodiment, the pertinent nominal dimensions are $S_i$ of 1.402 inches, $S_{maxo}$ of 1.740 inches, $S_{mimo}$ of 1.563 inches, and $S_a/W_a$ about 0.28.

The adaptor 52 is provided, numeral 86. The adaptor is preferably made of titanium, most preferably an alloy of 6 weight percent aluminum, 4 weight percent vanadium, balance titanium so as to be compatible with the injector 38.

The combustion chamber 22, the adaptor 52, the step collar 46, and the clip 58 are joined together, numeral 88. The joining is preferably accomplished by brazing using known operable braze alloys for the particular materials to be joined. To accomplish the brazing, the combustion chamber 22, the adaptor 52, the step collar 46, and the clip 58 are assembled together as subassemblies with a thin shim of braze alloy between the adaptor 52 and the step collar 46, another thin shim of braze alloy between the step collar 46 and the second leg 62 of the clip 58, and another thin shim of braze alloy between the outer cylindrical surface 30 of the wall 24 and the first leg 60 of the clip 58. The subassemblies, held together in tooling, are heated to appropriate brazing temperatures to melt the braze alloy. The assembly is then cooled so that the braze alloy solidifies and bonds the combustion chamber 22, the adaptor 52, the step collar 46, and the clip 58 into a single subassembly.

In assembling and joining the combustion chamber 22, the clip 58, and the step collar 46, care is taken so that there is no contact between any gold plating on the clip 58 and the iridium coating 65 of the combustion chamber. Experience has shown that an interdiffiusion of iridium and gold at elevated temperature may lead to a breach in the protective iridium coating, allowing a reaction of the combustion products with the underlying metallic substrate. The gap 64 ensures that there is no contact between the gold coating on the second leg 62 of the clip 58 and the iridium coating 65. The gold coating on the clip 58 is preferably machined away from a trough region 67 on the inside curvature of the web 63, to ensure that there can be no contact between gold in that region and the iridium coating 65.

The injector plate 38 is provided, numeral 90. The injector plate 38 is typically made of titanium, most preferably an alloy of 6 weight percent aluminum, 4 weight percent vanadium, balance titanium. The injector plate 38 is joined to the adaptor 52, numeral 92, preferably by electron beam welding.

A rocket engine made according to the preferred approach has been constructed and tested. The rocket engine had a specific impulse of 324 seconds, as compared with a specific impulse of 315 seconds for a rocket engine that is otherwise similar but lacks the internal step collar.

Although a particular embodiment of the invention has been described in detail for purposes of illustration, various modifications and enhancements may be made without departing from the spirit and scope of the invention.

Accordingly, the invention is not to be limited except as by the appended claims.

What is claimed is:

1. A rocket engine, comprising
   a combustion chamber having a generally cylindrical annular upper wall with a chamber outer diameter, a chamber inner diameter, and a chamber length, the chamber having an injector end and a nozzle end;
   an injector attached to the injector end of the combustion chamber;
   a generally cylindrical annular step collar fitting within the combustion chamber adjacent to the injector end thereof, the step collar having a step collar outer diameter, a step collar inner diameter, and a step collar length measured from the nozzle end of the combustion chamber, the step collar maximum outer diameter being less than the chamber inner diameter so that there is a gap between the step collar outer diameter and the chamber inner diameter, wherein the gap measured at room temperature is sufficiently great that a minimal clearance remains when the rocket engine is operated and the step collar expands radially outwardly toward the wall of the combustion chamber, and the gap is not larger than necessary to provide for such clearance during operation so that hot gas does not flow into the gap by a backdraft effect; and
   an attachment of the combustion chamber, the injector, and the step collar.

2. The rocket engine of claim 1, wherein the step collar maximum outer diameter is less than the chamber inner diameter by an amount of from about 0.020 inches to about 0.024 inches, measured at room temperature.

3. The rocket engine of claim 1, wherein the step collar length is from about 21 to about 31 percent of the chamber length.

4. The rocket engine of claim 1, wherein the step collar is made of a material selected from the group consisting of an alloy of platinum and rhodium, an alloy of columbium, and a ceramic.

5. The rocket engine of claim 1, wherein the combustion chamber is made of a first material, and the step collar is made of a second material different from the first material and having a greater corrosion and erosion resistance in a combustion chamber operating environment.

6. The rocket engine of claim 1, wherein the attachment comprises:
   a step collar/injector joint structure joining the step collar and the injector; and
   a clip structure joining the combustion chamber and the step collar, the clip structure comprising a C-shaped annular clip having
      a first leg extending parallel to the chamber length and with an inner diameter of about that of the outer diameter of the combustion chamber and affixed thereto,
      a second leg extending parallel to the chamber length and with an outer diameter of no greater than that of the outer diameter of the step collar and affixed thereto, and
      a web extending between the first leg and the second leg.

7. A rocket engine, comprising
a combustion chamber having a generally cylindrical annular upper wall with a chamber outer diameter, a chamber inner diameter, the chamber having an injector end and a nozzle end;
an injector attached to the injector end of the combustion chamber;
a generally cylindrical annular step collar fitting within the combustion chamber adjacent to the injector end thereof, the step collar having a step collar length measured from the nozzle end of the combustion chamber of from about 21 percent to about 31 percent of a chamber length measured from the injector end to a throat of the nozzle; and
an attachment of the combustion chamber, the injector, and the step collar.

8. The rocket engine of claim 7, wherein the step collar is made of a material selected from the group consisting of an alloy of platinum and rhodium, an alloy of columbium, and a ceramic.

9. The rocket engine of claim 7, wherein the combustion chamber is made of a first material, and the step collar is made of a second material different from the first material and having a greater corrosion and erosion resistance in a combustion chamber operating environment.

10. The rocket engine of claim 7, wherein the attachment comprises:
a step collar/injector joint structure joining the step collar and the injector; and
a clip structure joining the combustion chamber and the step collar, the clip structure comprising a C-shaped annular clip having
a first leg extending parallel to the chamber length and with an inner diameter of about that of the outer diameter of the combustion chamber and affixed thereto,
a second leg extending parallel to the chamber length and with an outer diameter of no greater than that of the outer diameter of the step collar and affixed thereto, and
a web extending between the first leg and the second leg.

11. A rocket engine, comprising
a combustion chamber having a generally cylindrical annular upper wall with a chamber outer diameter, a chamber inner diameter, and a chamber length, the chamber having an injector end and a nozzle end;
an injector attached to the injector end of the combustion chamber;
a generally cylindrical annular step collar fitting within the combustion chamber adjacent to the injector end thereof, the step collar having a step collar outer diameter, a step collar inner diameter, and a step collar length measured from the nozzle end of the combustion chamber of less than the chamber length, wherein the combustion chamber is made of a first material, and the step collar is made of a second material different from the first material and having a greater corrosion and erosion resistance in a combustion chamber operating environment; and
an attachment of the combustion chamber, the injector, and the step collar.

12. The rocket engine of claim 11, wherein the step collar maximum outer diameter being less than the chamber inner diameter by an amount of from about 0.020 inches to about 0.024 inches, measured at room temperature.

13. The rocket engine of claim 11, wherein the length of the step collar is from about 21 to about 31 percent of the chamber length.

14. The rocket engine of claim 11, wherein the step collar is made of a material selected from the group consisting of an alloy of platinum and rhodium, an alloy of columbium, and a ceramic.

15. The rocket engine of claim 11, wherein the attachment comprises:
a step collar/injector joint structure joining the step collar and the injector; and
a clip structure joining the combustion chamber and the step collar, the clip structure comprising a C-shaped annular clip having
a first leg extending parallel to the chamber length and with an inner diameter of about that of the outer diameter of the combustion chamber and affixed thereto,
a second leg extending parallel to the chamber length and with an outer diameter of no greater than that of the outer diameter of the step collar and affixed thereto, and
a web extending between the first leg and the second leg.

16. A rocket engine, comprising
a combustion chamber having a generally cylindrical annular upper wall with a chamber outer diameter, a chamber inner diameter, and a chamber length, the chamber having an injector end and a nozzle end;
an injector attached to the injector end of the combustion chamber;
a generally cylindrical annular step collar fitting within the combustion chamber adjacent to the injector end thereof, the step collar having a step collar outer diameter, a step collar inner diameter, and a step collar length measured from the nozzle end of the combustion chamber; and
an attachment of the combustion chamber, the injector, and the step collar, wherein the attachment comprises:
a step collar/injector joint structure joining the step collar and the injector; and
a clip structure joining the combustion chamber and the step collar, the clip structure comprising a C-shaped annular clip having
a first leg extending parallel to the chamber length and with an inner diameter of about that of the outer diameter of the combustion chamber and affixed thereto,
a second leg extending parallel to the chamber length and with an outer diameter of no greater than that of the outer diameter of the clip structure and affixed thereto, and
a web extending between the first leg and the second leg.

17. The rocket engine of claim 16, wherein the step collar maximum outer diameter being less than the chamber inner diameter by an amount of from about 0.020 inches to about 0.024 inches, measured at room temperature.

18. The rocket engine of claim 16, wherein the length of the step collar is from about 21 to about 31 percent of the chamber length.

19. The rocket engine of claim 16, wherein the step collar is made of a material selected from the group consisting of an alloy of platinum and rhodium, an alloy of columbium, and a ceramic.

20. The rocket engine of claim 16, wherein the combustion chamber is made of a first material, and the step collar is made of a second material different from the first material with a melting point greater than that of the first material.

* * * * *